United States Patent [19]

Whimp

[11] 4,306,402
[45] Dec. 22, 1981

[54] GANG MOWERS

[75] Inventor: Raymond G. Whimp, Paihia, New Zealand

[73] Assignee: AHI Whimpway Limited, New Zealand

[21] Appl. No.: 157,497

[22] Filed: Jun. 9, 1980

Related U.S. Application Data

[63] Continuation of Ser. No. 909,065, May 24, 1978, abandoned.

[51] Int. Cl.³ .................... A01D 75/30; A01D 69/04
[52] U.S. Cl. ........................... 56/7; 56/13.6; 56/10.6
[58] Field of Search .......... 56/6, 7, 10.2, 10.6, 56/10.7, 13.6, 11.4, 14.9, 15.6, 15.7

[56] References Cited

U.S. PATENT DOCUMENTS

| | | | |
|---|---|---|---|
| 1,490,127 | 4/1924 | Peters | 56/10.6 |
| 1,725,487 | 8/1929 | Steinmetz et al. | 56/10.6 |
| 2,177,189 | 10/1939 | Roseman | 56/7 |
| 2,222,840 | 11/1940 | Holmes | 56/15.5 |
| 2,704,921 | 3/1955 | Cunningham, Jr. | 56/7 |
| 2,743,567 | 5/1956 | Martin | 56/6 |
| 3,208,207 | 9/1965 | Bottenberg | 56/14.9 |
| 3,264,807 | 8/1966 | Wallace | 56/10.6 |
| 3,425,197 | 2/1969 | Kita | 56/10.2 |
| 3,508,384 | 4/1970 | Madre | 56/15.5 |
| 3,616,626 | 11/1971 | Bramley et al. | 56/7 |
| 3,729,910 | 5/1973 | Hardee | 56/11.9 |
| 3,841,069 | 10/1974 | Weck | 56/11.9 |
| 3,908,398 | 9/1975 | Braunberger | 56/15.7 |
| 3,914,928 | 10/1975 | Weaver | 56/15.6 |

Primary Examiner—Paul J. Hirsch
Attorney, Agent, or Firm—Stevens, Davis, Miller & Mosher

[57] ABSTRACT

A gang mower comprises a number of individual reel mowers ganged together, each reel being driven by an electric motor from an electric power source, such as an alternator, associated with the mower. The alternator is typically driven by the same motor that propels the gang mower along.

7 Claims, 3 Drawing Figures

GANG MOWERS

This is a Continuation of application Ser. No. 909,065 filed May 24, 1978, now abandoned.

BACKGROUND OF THE INVENTION

This invention is concerned with improvements in or relating to gang mowers.

Gang mowers comprise a plurality of individual mowing units which are linked together and which are towed or propelled together, the arrangement of the gang being such that a much wider swath of grass can be cut in a single pass than is possible with a single mower unit. Gang mowers are commonly used to cut grass on golf courses, but, of course, can be and are used in other applications. Usually the reels of the individual mowers are driven from the wheels or by hydraulic motors.

An example of the prior art is rotary mower described in New Zealand Patent Specification No. 177649 of Multinorm B.V. which described rotary cutters arranged in pairs and preferably dirven by hydraulic motors. It has now been found, however, that electrically driven reel mowers are more efficient, and are better suited to cutting large areas of grass such as on golf courses or airfields.

It is an object of the present invention to provide a gang mower wherein the reel of each mower unit is driven by an electric motor. Mowers which are powered by electric motors are known but are operated from a mains supply, this necessitating an electric cord between the mower and the mains supply which of course, places limitations on the areas which can be covered by such mowers.

SUMMARY OF THE INVENTION

The present invention consists in a gang mower comprising a plurality of reel mowers ganged together and each powered by an electric motor which receives power from a portable electric power source associated with the gang mower.

BRIEF DESCRIPTION OF THE DRAWINGS

The above gives a broad description of the present invention a preferred form of which will now be described with reference to the accompanying drawings, in which.

DESCRIPTION OF PREFERRED EMBODIMENT

Figure 1:
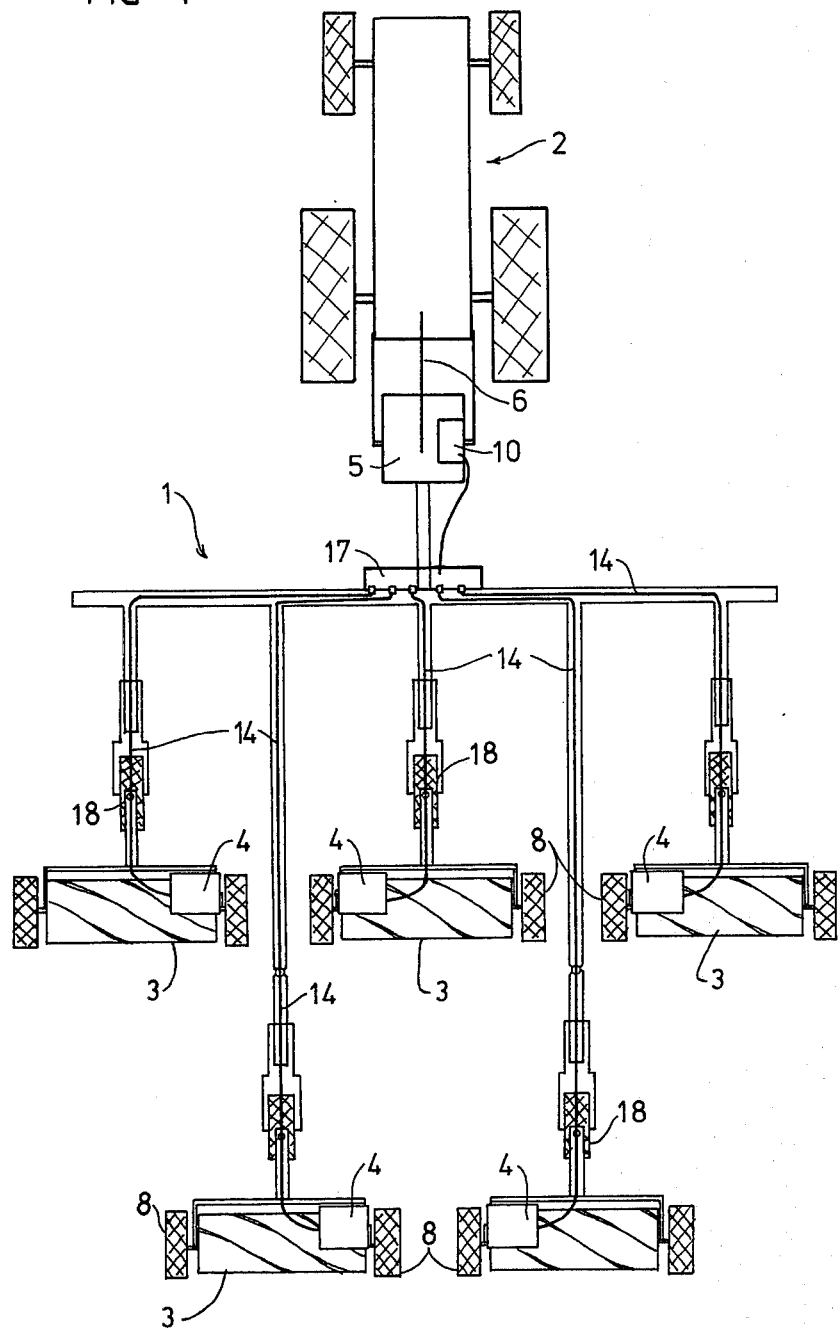
FIG. 1 is a plan view of a preferred embodiment of the present invention.
Figure 2:
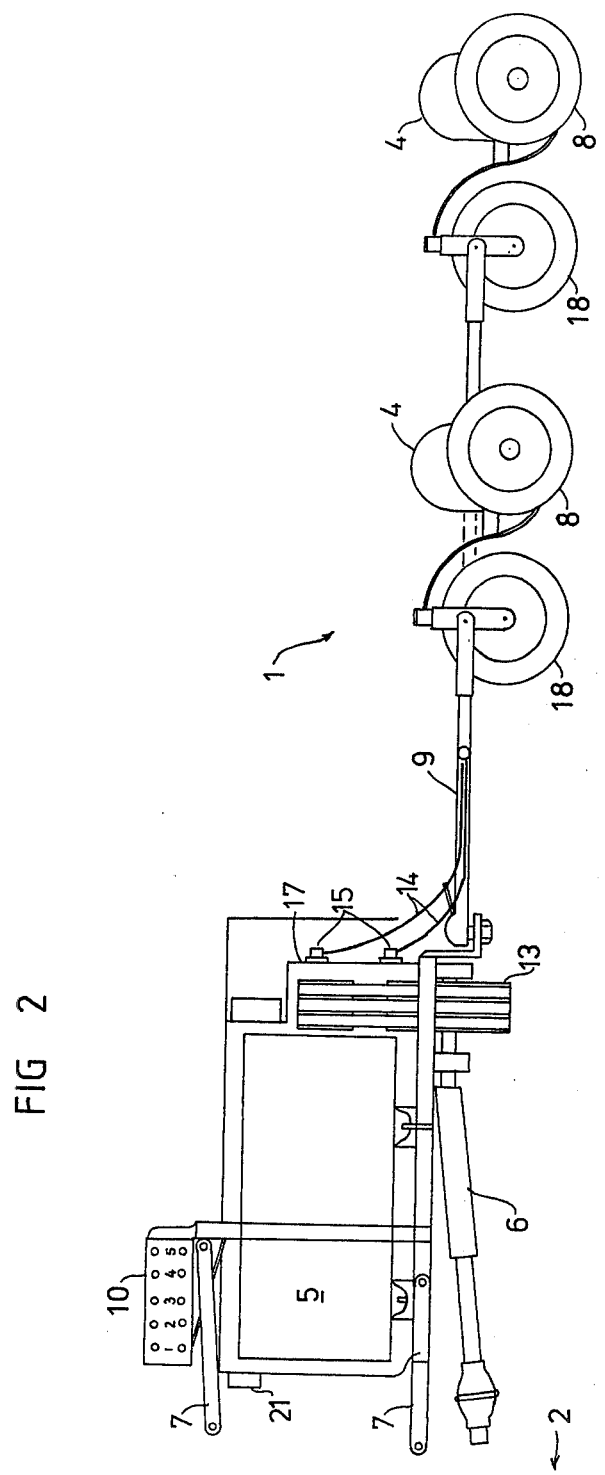
FIG. 2 is a side elevation of the embodiment shown in FIG. 1.
Figure 3:
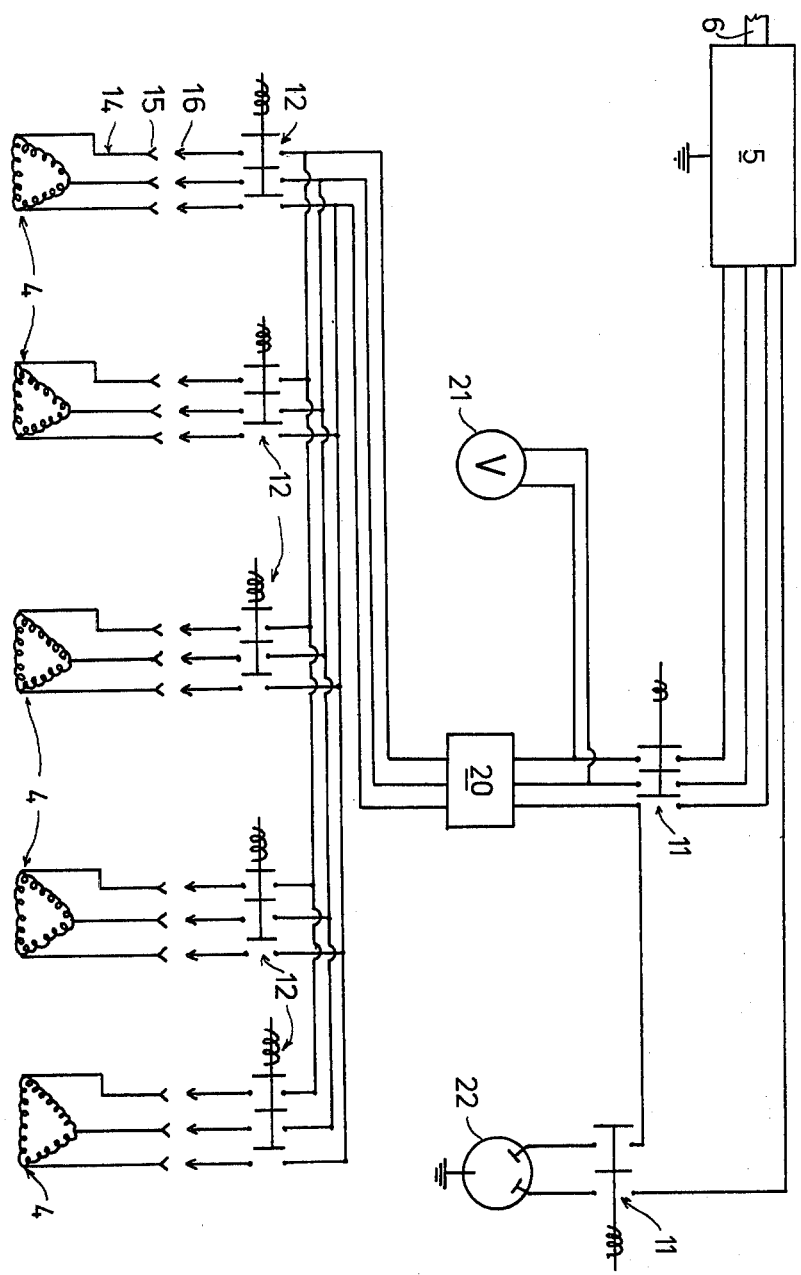
FIG. 3 is a circuit diagram of a preferred form of the present invention.

According to the embodiment of the present invention illustrated in the drawings a gang mower 1 of the type adapted to be towed behind a towing vehicle 2, such as a tractor, has the reel, 3 of each individual mower driven in use by means of an electric motor 4, there being a separate electric motor for each individual mower. The drawings show each mower comprising a reel 3 mounted between a pair of wheels 8, towed behind a jockey wheel 18. Many other arrangements are possible, however. For example, the mowers could all be mounted on retractable arms, pivoted to a single rigid drawbar. The retractable arms could be operated by hydraulic rams connected to the tractor hydraulic system, so that the arms can be retracted, drawing the mowers in, for convenience of transporting the mower along roads to different mowing areas. Such units do not require the jockey wheel 18.

The reels 3 preferably have a drive connection at each end so that it does not matter which side of the mower the motor 4 is mounted on.

At each side of the box housing the alternator there can be a foot telescopically operable to be raised or lowered. When lowered the feet provide a support for the housing when it is not connected to a tractor. The feet can be held in either their lowered or raised position by a pin passing through apertures in the vertical column of each foot and in the tube within which the foot column is telescopically slidable.

Associated with the gang mower is a portable electric generator, or preferably an alternator 5, which is driven from the engine of the towing vehicle preferably by means of a connection to the power take-off 6 of the towing vehicle through a step-up drive, either by a gear box or pulley belt arrangement 13 or alternatively by means of a direct coupling to the crank shaft of the towing vehicle. The preferred alternator has a 15 kilowatt, 3-phase, 200 volt rating and therefore 3-phase electric motors are used, these preferably ranging between ¾ to 3 horsepower in rating though alternators and motors having other specifications can be used. The alternator would be driven at the maker's specified rpm which for many alternators would be about 1500 rpm.

The alternator can be either mounted on a separate frame to be suitable for connection to a three point linkage 7 as commonly used on tractors, or on the gang mower draw bar 9, or alternatively on a framework which carries the mounted mowers of the gang. The alternator and the electric motors would preferably be drip-proofed or water-proofed so that they would not be adversely affected by use in unfavourable weather conditions.

A control box 10 is mounted on the alternator unit and protection circuit breakers 11 are incorporated in the control box. Power from the alternator passes through the control box to a plug box 17 which can be mounted on the mower draw bar, or on the tractor, or on framework supporting the alternator, or on framework carrying the mounted mowers of the gang, whichever is the most convenient for the type of model and number of mowers in the gang. The control box incorporates one starter 12 for each electrical motor of the gang. The electric wiring between the alternator, plug box and the control box is preferably permanently connected.

Power is fed to the electric motors 4 by means of cables 14 which are re-movably connected to the plug box 17 by plugs 15 which fit into sockets 16 of the plug box.

Also situated within the plug box 10 is a forward/reverse switch 20 which enables the direction of rotation of the mowers to be reversed and a volt meter 21 for indicating the voltage output of the alternator 5. If desired there may also be an appliance plug 22 from which any 110 volt electrical appliance can be run.

In an alternative embodiment the control box can be mounted directly on the draw bar 9, doing away with the need for a separate plug box. In this case the cables 14 would be permanently wired to the control box. A single cable would run from the control box to a power outlet on the alternator housing, and another would run to a remote switch unit near the operator's seat. The meter 21 would also be mounted on the remote switch unit.

In an alternative form of the invention the gang mower can be of the self-propelled type and in this case the motor of the gang mower is also used to drive an alternator or generator. As before, it is preferable that each individual mower of the gang has its own electric motor.

What I claim is:

1. A gang mower suitable for being propelled along the ground by an engine driven vehicle, including:
   (a) a frame connectable to move with said vehicle;
   (b) an alternator assembly securable to said vehicle, said alternator being couplable with said engine of said vehicle, whereby said engine speed and alternator output voltage vary together;
   (c) a plurality of cutting reel assemblies attached to said frame said cutting reel assemblies experiencing a load which varies with respect to the ground speed of said vehicle;
   (d) each of said cutting reel assemblies including a cutting reel mounted between and supported by a pair of wheels;
   (e) a single electric motor mounted on each cutting reel assembly in driving engagement with the corresponding cutting reel; and
   (f) power supply cables connected to each of said electric motors from said alternator to supply electrical power generated by said alternator assembly whereby when said engine speed decreases, decreasing said vehicle ground speed and the voltage from said alternator, the load applied to said cutting assembly decreases to correspondingly lower voltage requirements for said motor.

2. The gang mower as claimed in claim 1 wherein said alternator assembly is a three-phase alternator and each electric motor is a three-phase motor.

3. The gang mower as claimed in claim 1 wherein the gang mower frame is towed by said vehicle and the electric alternator assembly is driven from the crank shaft or a power take-off of the towing vehicle.

4. The gang mower as claimed in claim 1 wherein the gang mower is of the self-propelled type and the electric alternator is driven by the propelling means of the mower.

5. The gang mower as claimed in claim 1 wherein each reel is drivable from either end.

6. The gange mower as claimed in claim 1 including a hydraulically retractable arm pivoted to said frame, said cutting reel assemblies of said mower being mounted on said arm.

7. The gang mower as claimed in claim 1 wherein each cutting wheel assembly is pivotally mounted behind a jockey wheel attached to said frame.

* * * * *